US010537827B2

(12) United States Patent
Dil

(10) Patent No.: US 10,537,827 B2
(45) Date of Patent: Jan. 21, 2020

(54) ROTARY EVAPORATOR HAVING A FASTENING DEVICE WITH CLAMPING ELEMENTS

(71) Applicant: HANS HEIDOLPH GMBH & Co KG, Kelheim (DE)

(72) Inventor: Roman Dil, Nuremberg (DE)

(73) Assignee: HANS HEIDOLPH GMBH & CO KG, Kelheim (DE)

( * ) Notice: Subject to any disclaimer, the term of this patent is extended or adjusted under 35 U.S.C. 154(b) by 187 days.

(21) Appl. No.: 15/327,810

(22) PCT Filed: Jul. 14, 2015

(86) PCT No.: PCT/EP2015/066058
§ 371 (c)(1),
(2) Date: Jan. 20, 2017

(87) PCT Pub. No.: WO2016/012307
PCT Pub. Date: Jan. 28, 2016

(65) Prior Publication Data
US 2017/0209805 A1    Jul. 27, 2017

(30) Foreign Application Priority Data

Jul. 22, 2014   (DE) .................. 10 2014 110 343

(51) Int. Cl.
*B01D 3/08*       (2006.01)
*F16L 37/12*      (2006.01)
*B01D 3/12*       (2006.01)

(52) U.S. Cl.
CPC ............... *B01D 3/085* (2013.01); *B01D 3/08* (2013.01); *B01D 3/12* (2013.01); *F16L 37/122* (2013.01)

(58) Field of Classification Search
None
See application file for complete search history.

(56) References Cited

U.S. PATENT DOCUMENTS 1,046,328 A    12/1912   Preuss
5,243,836 A     9/1993   Spring
(Continued)

FOREIGN PATENT DOCUMENTS

DE    1519744 A1    6/1970
DE    7738469 U1    6/1978
(Continued)

OTHER PUBLICATIONS

Translation of DE102012007670. (Year: 2012).*
International Search Report of PCT/EP2015/066058 dated Sep. 9, 2015.

*Primary Examiner* — Matthew D Krcha
(74) *Attorney, Agent, or Firm* — Amster, Rothstein & Ebenstein LLP

(57) ABSTRACT

The invention relates to a rotary evaporator comprising a rotary drive and a fastening device attached to the rotary drive and having a receiving space for receiving an evaporator flask rotatable by the rotary drive, wherein the fastening device comprises a connector section, in particular a ring-shaped connector section, at the rotary drive side and a retainer element, in particular a ring-shaped retainer element, at the evaporator flask side that coupled to the connector section and that is rotatable relative to the connector section between a starting position and an end position. The fastening device comprises at least one clamping element that is moved, on the rotation of the retainer element relative to the connector section from the starting position into the end position, from a release position radially inwardly into a holding position in which the respective clamping element projects into the receiving space to hold a flange-shaped connection region of an evaporator flask received in the receiving space of the fastening device in a (Continued)

Figure 1:
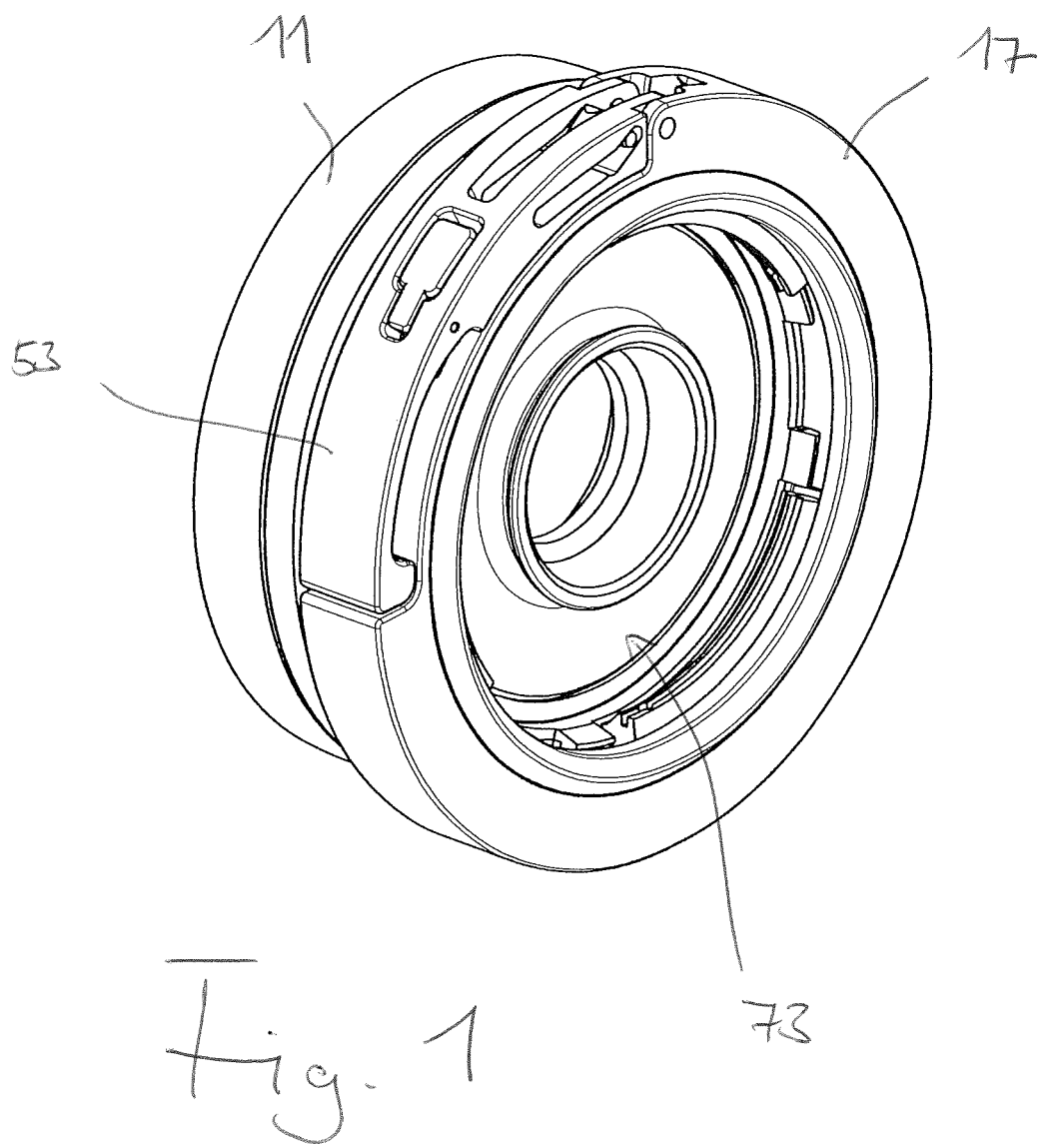

form-fitting and/or force-fitting manner and to secure it against a removal from the receiving space.

36 Claims, 5 Drawing Sheets

(56) References Cited

U.S. PATENT DOCUMENTS

| | | | |
|---|---|---|---|
| 5,516,159 A | 5/1996 | Hirakawa | |
| 6,709,025 B2* | 3/2004 | Spring | B01D 3/085 |
| | | | 285/231 |
| 2003/0155763 A1* | 8/2003 | Wolf | F16L 37/084 |
| | | | 285/39 |
| 2006/0157979 A1* | 7/2006 | Pedersen | F16L 33/00 |
| | | | 285/319 |
| 2008/0210384 A1 | 9/2008 | Guthrie | |
| 2010/0193345 A1 | 8/2010 | Carl | |
| 2011/0272888 A1* | 11/2011 | Irizzary | F16L 21/03 |
| | | | 277/314 |

FOREIGN PATENT DOCUMENTS

| | | |
|---|---|---|
| DE | 3114449 A1 | 10/1982 |
| DE | 202007006853 U1 | 7/2007 |
| DE | 102011115422 A1 | 4/2013 |
| DE | 102012007670 A1 | 10/2013 |
| EP | 0936391 A1 | 8/1999 |
| EP | 2213253 A1 | 8/2010 |
| EP | 2213353 A1 | 8/2010 |
| WO | 2009018847 A2 | 2/2009 |
| WO | 2009018874 A2 | 2/2009 |

* cited by examiner

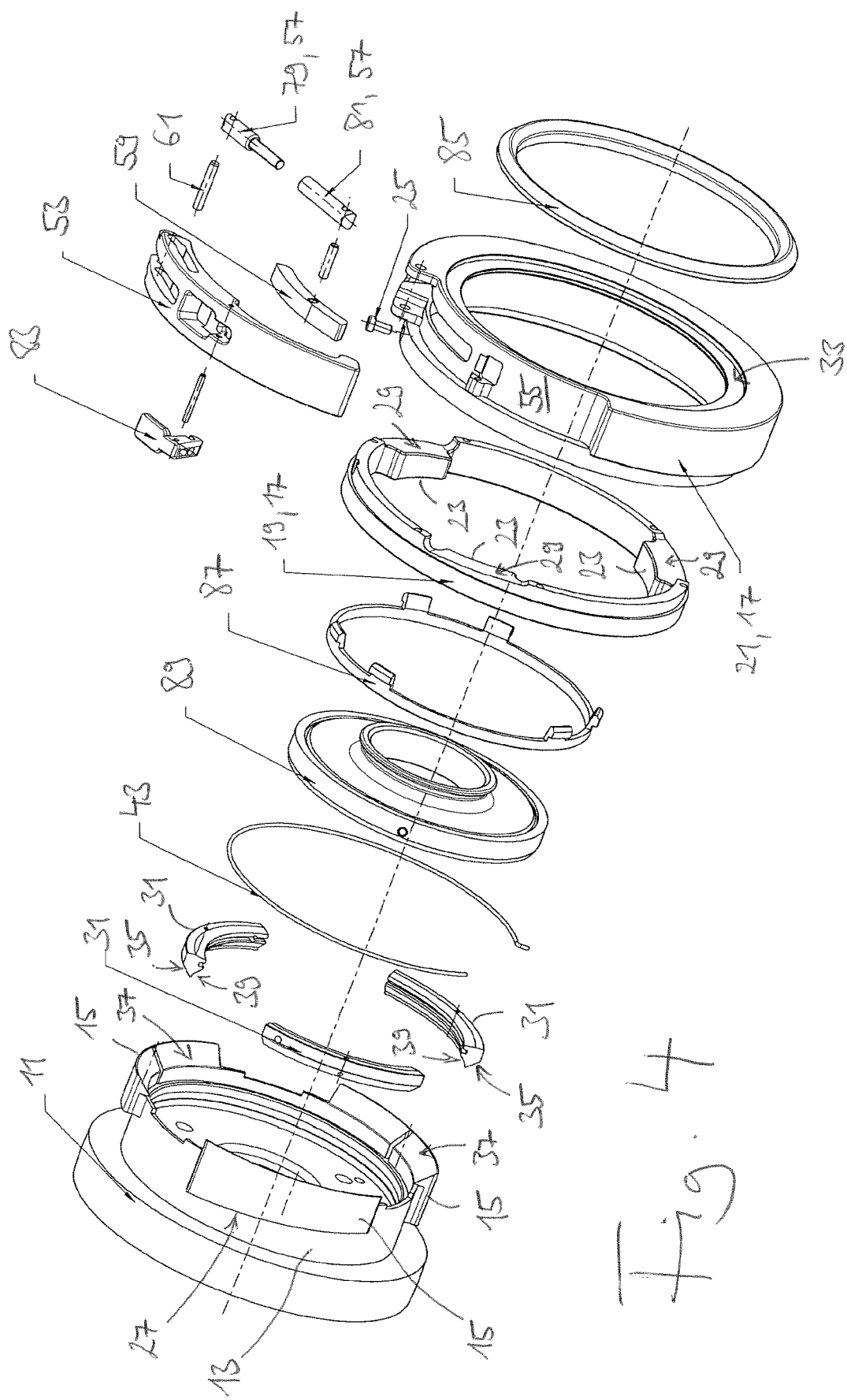

ROTARY EVAPORATOR HAVING A FASTENING DEVICE WITH CLAMPING ELEMENTS

The present invention relates to a rotary evaporator comprising a rotary drive and a fastening device attached to the rotary drive and having a receiving space for receiving an evaporator flask rotatable by the rotary drive, wherein the fastening device comprises a connector section, in particular a ring-shaped connector section, at the rotary drive side and a retainer element, in particular a ring-shaped retainer element, at the evaporator flask side that is couplable or coupled to the connector section and that is rotatable relative to the connector section between a starting position and an end position.

Rotary evaporators are pieces of laboratory equipment that are used for evaporating distillates such as solvents. The evaporator flask fastened to the rotary drive is typically heated by means of a heating bath, a heating dish, a heating mantle or a heating container to accelerate the evaporation process. The evaporator flask is uniformly heated due to the rotation and a thin liquid film is produced at the heated inner wall of the evaporator flask which has a large surface and from which the distillate can be evaporated fast, efficiently and gently. In principle, an evaporation can also be effected solely by generating a vacuum, i.e. a heating of the evaporator flask is not absolutely necessary.

The evaporated distillate flows via a vapor passage into a cooler of the rotary evaporator to condense there. The condensate is subsequently collected in a collection flask. The distillation residue remaining in the evaporator flask can be further processed or analyzed. If required, a vacuum pump is additionally provided for the generation of a vacuum in the evaporator flask and in the cooler to lower the boiling point, whereby the distillation can be further accelerated and the distillation rate can be increased accordingly.

It is known for the fastening of an evaporator flask to the rotary drive to place a retainer nut over the connection flange of the evaporator flask and to secure it there with an insert ring and then to screw the retainer nut firmly to an external thread of the hub of the rotary drive. It is necessary for this purpose to position the flask flange sufficiently exactly at the external thread of the hub by the retainer nut, to fix the hub in a rotationally fixed manner and simultaneously to rotate the retainer nut. This fastening process is in particular associated with considerable difficulties for the user with large rotary evaporators that can receive evaporator flasks having a capacity of, for example, 6 liters, 10 liters or 20 liters due to the high inherent weight of the evaporator flask, in particular of a filled evaporator flask. Similar problems result on the release of an evaporator flask from the rotary drive. Furthermore, a certain force exertion is required to tighten the retainer nut at the rotary drive with the required tightening torque. It is therefore endeavored to simplify the handling of rotary evaporators.

This object is satisfied by a rotary evaporator having the features of claim 1 and in particular in that the fastening device comprises at least one clamping element that is moved, on the rotation of the retainer element relative to the connector section from the starting position into the end position, radially inwardly from a release position into a holding position in which the respective clamping element projects into the receiving space to hold a flange-shaped connection region of an evaporator flask received in the receiving space of the fastening device in a form-fitting and/or force-fitting manner and to secure it against a removal from the receiving space.

The invention accordingly provides that a rotary movement of the retainer element is converted into a radially inwardly directed movement of the at least one clamping element. The flange-shaped connection region of an evaporator flask received in the receiving space of the fastening device can be held in a form-fitting and/or force-fitting manner by the at least one clamping element. The flange-shaped connection region can in particular be engaged behind by the at least one clamping element.

Where the present application speaks of a or the clamping element, this in particular relates to the clamping element and/or to at least one or all of a plurality of clamping elements. When a plurality of clamping elements are present, they can also be called clamping segments The fastening device is in particular configured such that a plurality of clamping elements are respectively moved from a release position radially inwardly into a holding position on the rotation of the retainer element relative to the connector section from the starting position into the end position. The flange-shaped connection region of an evaporator flask can then be surrounded in a form-fitting and/or force-fitting manner by a plurality of clamping elements arranged distributed in the peripheral direction.

The inner space surrounded by the ring-shaped connector section and/or by the ring-shaped retainer element in particular comprises the receiving space; the retainer element is arranged radially outside the connector section and/or the clamping element is retracted from the receiving opening with respect to the holding position in the release position, in particular such that the flange-shaped connector section of an evaporator flask can be introduced into the receiving space of the fastening device. The retainer element is preferably rotated relative to the connector section such that the connector section is held rotationally fixedly and the retainer element is rotated.

In accordance with a preferred embodiment of the invention, the respective clamping element is moved on the rotation of the retainer element relative to the connector section from the starting position radially inwardly and simultaneously axially toward the connector section. The movement of the clamping element radially inwardly on a rotation of the retainer element relative to the connector section from the starting position into the end position can accordingly be superposed by an axial movement of the clamping element that additionally occurs, and indeed toward the connector section. It is, however, generally also possible that the clamping element undergoes a movement that is only radially inwardly directed on the rotation of the retainer element relative to the connector section.

The connector section can be fastened to the rotary drive, in particular to a hub of the rotary drive, in particular via one or more screw connections. The connector section can be formed separately from the rotary drive. The connector section can in particular be formed as a connector ring. The connector section can alternatively also form an end of the hub of the rotary drive. The connector section can be formed in one piece with the hub of the rotary drive. The end of the hub can project from a housing of the rotary drive.

The retainer element is preferably releasably couplable or coupled, in particular connectable or connected, to the connector section and is in particular axially placeable onto the connector section in the starting position. The retainer element can then be removed from the connector section in a nondestructive manner or the fastening device can be dismantled in a nondestructive manner.

The coupling, in particular the connection, of the retainer element to the connector section can take place free of a screw connection. Unlike in the initially named prior art, the retainer element is then not screwed onto an external thread formed at the hub of the rotary drive. The coupling of the retainer element to the connector section can generally takes place by push-and-rotate movement, in particular by a bayonet connection.

The retainer element can be placed onto the connector section into the starting position in one or more discrete rotational positions, for example three discrete rotational positions. A placement of the retainer element onto the connector section at any desired angle of rotation is then not possible. The coupling of the retainer element to the connector section can accordingly have an n-fold symmetry axis.

In accordance with a preferred embodiment of the invention, the connector section comprises a plurality of radially outwardly projecting first engagement elements and the retainer element comprises a plurality of radially inwardly projecting second engagement elements, wherein the first engagement elements and the second engagement elements meshingly engage into one another in the starting position and engage behind one another in a rotated position. A simple and reliable coupling of the retainer element to the connector section can hereby be achieved. The first engagement elements and the second engagement elements are preferably arranged evenly distributed in the respective peripheral direction at the connector section and at the retainer element, respectively. It can hereby be ensured that the retainer element can be placed onto the connector section into the starting position in a plurality of discrete rotational positions.

The respective clamping element is in particular arranged between the connector section and the retainer element. On the rotation of the retainer element relative to the connector section from the starting position into the end position, the respective clamping element is in particular pressed by the retainer element, in particular by a ring web projecting radially inwardly at the retainer element, axially toward the connector section, in particular a respective first engagement element such as has been explained above.

In accordance with a preferred embodiment of the invention, means are provided that convert a rotation of the retainer element relative to the connector section from the starting position into the end position into an axial movement of the retainer element relative to the connector section, with further means being provided that convert the axial movement of the retainer element into the radial movement, in particular the radial, and simultaneously, an axial movement, of the respective clamping element.

The means preferably comprise for this purpose sloping surfaces that correspond to one another and that are formed, in particular at the above-explained radially outwardly projecting first engagement elements, on the one hand, and at the retainer element, on the other hand, in particular at the above-explained radially inwardly projecting second engagement elements. The rotational movement of the retainer element is converted into the axial movement of the retainer element via the sloping surfaces.

The further means can comprise the respective clamping element being chamfered at its radially outer edge facing the connector section and the connector section, in particular a respective first engagement such as has been explained above, having a chamfer corresponding hereto, whereby the respective clamping element is moved, on the rotation of the retainer element relative to the connector position into the end position, radially inwardly and axially toward the connector section. It is, however, generally also possible, for example by mutually corresponding sloping surfaces at the retainer element and at the respective clamping element, with no mutually corresponding chamfers being provided at the clamping element and at the connector section, that the respective clamping element, on the rotation of the retainer element relative to the connector section, is only moved radially inwardly.

To hold the flange-shaped connection region of an evaporator flask received in the receiving space of the fastening device in a form-fitting and force-fitting manner, it is preferred if the respective clamping element is chamfered at its radially inner edge facing the connector section to cooperate with a chamfer corresponding herewith at the flange-shaped connection region of an evaporator flask received in the fastening device.

The respective clamping element is preferably preloaded from its holding position into the release position. The respective clamping element can then, on the rotating back of the retainer element relative to the connector section, be moved back from the holding position into the release position to release the flange-shaped connection region of an evaporator flask received in the receiving space of the fastening device again for a removal of the evaporator flask. To preload the respective clamping element, a circlip can be provided that in particular engages at a radial inner surface of the respective clamping element. With a plurality of clamping elements, a common circlip can in particular be provided that engages at the radial inner surfaces of the clamping elements.

The respective clamping element is preferably elongated and/or in the form of a part circle. It is preferred with a plurality of clamping elements if they are arranged evenly distributed in the peripheral direction. The respective clamping element can cooperate with a respective first engagement element of the connector section, such as has been explained above.

In accordance with a preferred embodiment of the invention, the retainer element is provided with a tensioning lever for the rotation, the tensioning lever being supported at an articulation point pivotably at the retainer element at one end and being adjustable between an open position and a closed position in which the respective clamping element adopts the holding position. Higher tightening torques can be achieved with less force exertion by a tensioning lever than by the retainer nut in accordance with the initially named prior art, whereby a better leak-tightness of the connection can be achieved between the evaporator flask and the rotary drive or between the evaporator flask and the vapor passage.

It is preferred in this respect if the tensioning lever is coupled to the retainer element and to the connector section that the rotation of the retainer element relative to the connector section from the starting position into the end position takes place in two stages, wherein in a first stage the retainer element is rotated with an open tensioning lever from the starting position by a first part distance into an abutment position for the tensioning lever, and wherein in a second stage the tensioning lever is closed to rotate the retainer element from the abutment position by a second part distance into the end position. In the first part distance, the respective clamping element can be traveled radially inwardly in the direction of the holding position toward a flange-shaped connection region of an evaporator flask received in the receiving space of the fastening device, with a form-fitting or force-fitting holding of the flange-shaped connection region or the actual tensioning only taking place in the second part distance.

It is of advantage in this respect if the first part distance is longer than the second part distance, in particular at least twice as long, preferably at least four times as long. The release position of the respective clamping element can be withdrawn sufficiently far out of the receiving space by a comparatively long first part path to allow a problem-free insertion of a flange-shaped connection region of an evaporator flask into the receiving space.

The rotating back of the retainer element relative to the connector section from the end position into the starting position in particular also takes place in two stages, with in a first stage the tensioning lever being opened to rotate the retainer element back by the second part distance from the end position and with in a second stage the retainer element being rotated back into the starting position with an open tensioning lever.

The longitudinal extent of the tensioning lever preferably extends in the peripheral direction of the retainer element. The tensioning lever is preferably of part-circular form and/or is received in a radially outer recess of the retainer element in the closed position. To ensure a simple actuation of the tensioning lever over its total pivot range, it is preferred if the pivot region of the tensioning lever between the open position and the closed position amounts to no more than 120°, in particular no more than 100°.

The tensioning lever can in particular act as a toggle lever on closing to rotate the retainer element from the abutment position by the above-explained second part distance into the end position.

In accordance with a preferred embodiment of the invention, a control arm is provided whose first end is supported, in particular indirectly or directly, pivotably at the connector section and whose second end is in engagement via a guide element, in particular a cylinder pin, with a control cam, in particular a guide slot, formed at the tensioning lever. The above-explained two-stage rotation of the retainer nut relative to the connector element is hereby made possible, for example.

The first end of the control arm can in this respect be pivotably supported at a tensioning element that is inserted into a correspondingly configured mount of the connector section that prevents a rotation of the tensioning element relative to the connector section. The tensioning element can in particular be inserted between two radially outwardly projecting engagement elements of the connector section, in particular first engagement elements such as have been explained above.

The control cam preferably has a first section, in particular a straight section, and a second section adjoining it at an angle at a kink point, in particular a straight section, having an end point. It can be ensured by the angling of the second section with respect to the first section that, on the one hand, the guide element cannot escape in the direction of a starting point explained in more detail in the following on the closing of the tensioning lever and that, on the other hand, the opening of the tensioning lever is possible substantially without force exertion at the start.

For this purpose, the first section can extend at least substantially tangentially to the retainer nut in the closed position and/or can extend at least substantially radially to the retainer nut in the closed position and/or the second section can be angled away from the retainer nut with respect to the first section in the closed position of the tensioning lever. Alternatively and/or additionally, the first section and/or the second section can extend at least substantially along the longitudinal extent of the tensioning lever.

It is preferred if the guide element in the starting position of the retainer element is located at a starting point in the first section and is traveled to the end point on the rotation of the retainer nut relative to the connector section by the above-explained first part distance and/or that the guide element remains at the end point on the rotation of the retainer element relative to the connector section by the above-explained second part distance. It is furthermore preferred if the guide element is traveled to the kink point on the rotating back of the retainer element relative to the connector section by the second part distance and/or that the guide element is traveled to the starting point on the rotating back of the retainer element relative to the connector section by the first part distance.

In another respect, the control arm can be longitudinally adjustable. The control arm can comprise a tensioning screw and a clamping nut for this purpose. The clamping nut can in particular be screwed onto the tensioning screw by a different distance, in particular continuously, to set the length of the control arm. The above-explained starting point of the guide element can then be settable in the first section of the control cam via the length of the control arm. Finally, the tightening torque exerted by the tensioning lever in the closed position can be set via the length of the control arm.

A latching device is preferably provided to latch the tensioning lever in the closed position at the retainer element. This can be achieved, for example by a catch that is pivotably supported in the tensioning lever and engages into a latching mount formed in or at the retainer element. The catch can be preloaded in the direction of a latching position. The catch can have a latching nose that engages behind a latching edge of the latching mount in a latching position.

The radially inner edge of the retainer element remote from the connector section is preferably provided with an outer edge protective ring and/or the radial inner edge of the connector section facing the retainer element is provided with an inner edge protective ring. In addition to the function as an edge protection to prevent a break of the evaporator flask on the insertion into the receiving space, the outer edge protective ring can also take over a centering function or an insertion aid for the evaporator flask to be inserted.

It is preferred for the edge protection function and/or for the centering function if the radially inner edge of the outer edge protective ring remote from the connector section is chamfered and/or if the radially inner edge of the inner edge protective ring facing the retainer element is chamfered.

It is furthermore preferred if the largest inner diameter of the chamfer of the inner edge protective ring is not smaller than the smallest inner diameter of the chamfer of the outer edge protective ring. The insertion of the evaporator flask into the receiving space can hereby be further simplified.

The present invention furthermore relates to a fastening device, in particular for a rotary evaporator, comprising a receiving space for receiving a laboratory container, in particular an evaporator flask, wherein the fastening device comprises a connector section, in particular of ring shape, and a retainer element, in particular of ring shape, that is coupled to the connector section and is rotatable relative to the connector section between a starting position and an end position; and wherein the fastening device comprises at least one clamping element that is moved, on the rotation of the retainer element relative to the connector section from the starting position into the end position, from a release position radially inwardly into a holding position in which the respective clamping element projects into the receiving space to hold a flange-shaped connection region of a piece of laboratory equipment received in the receiving space of the fastening device in a form-fitting and/or force-fitting manner and to secure it against a removal from the receiving space.

Further developments of the fastening device in accordance with the invention result in an analog manner from the further developments described above with respect to the rotary evaporator in accordance with the invention.

Further developments of the invention are also set forth in the dependent claims, in the description and in the enclosed drawing.

Figure 3:
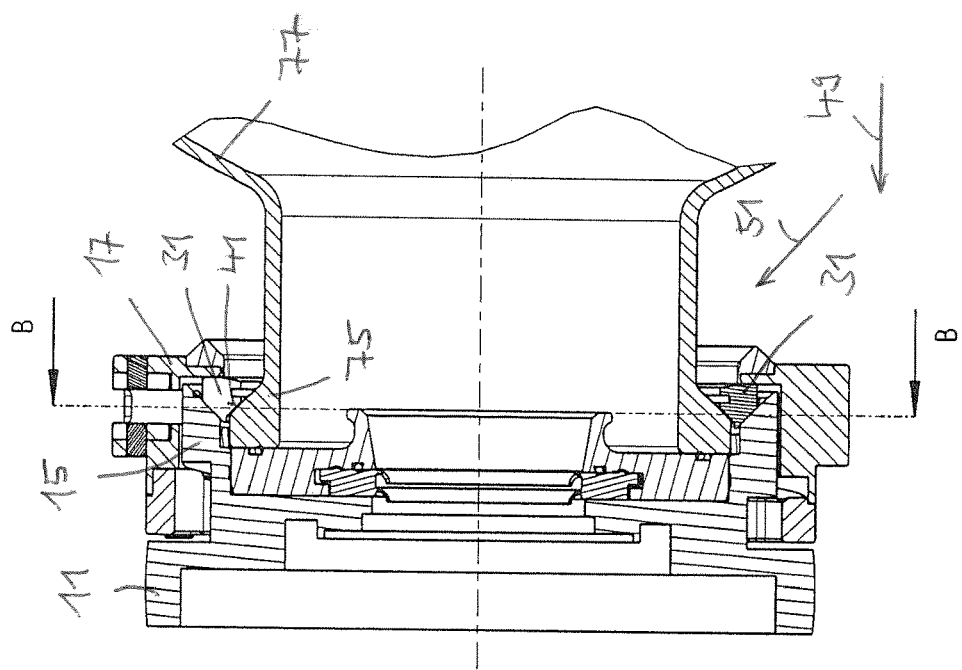
Figure 2:
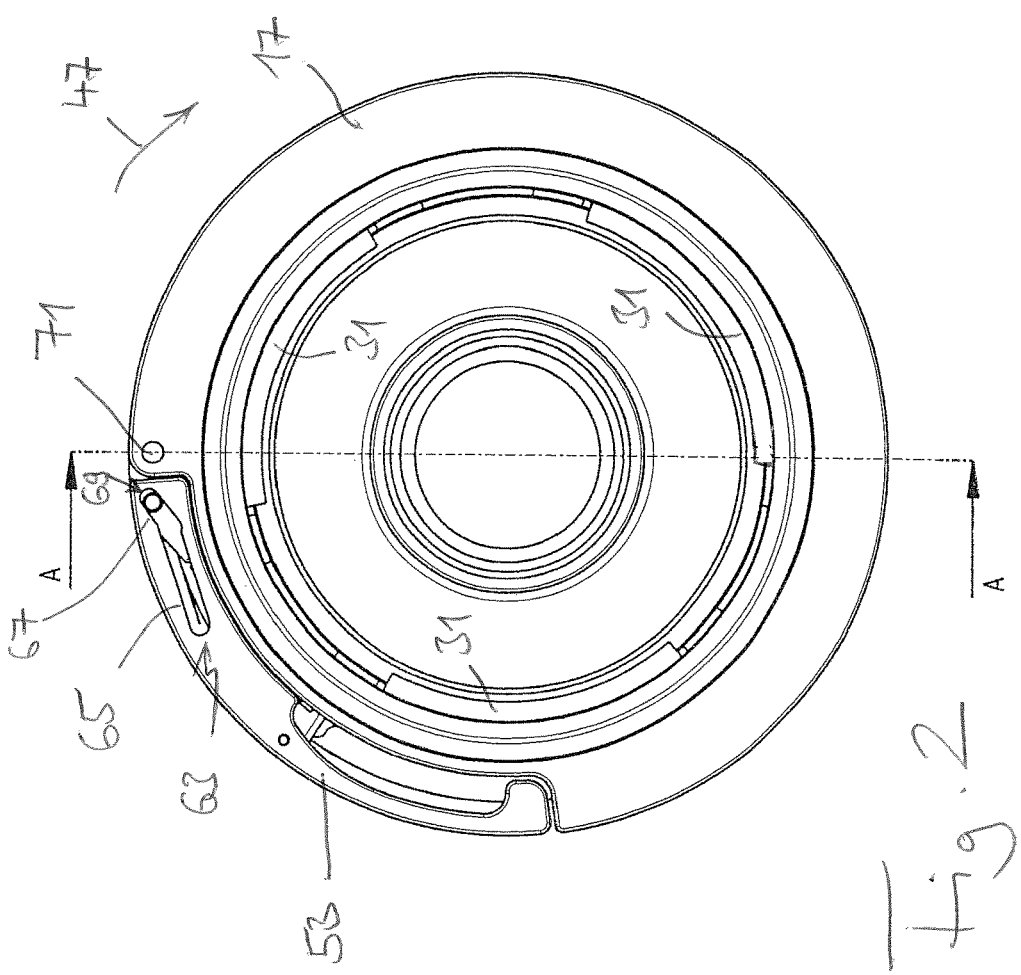
Figure 5:
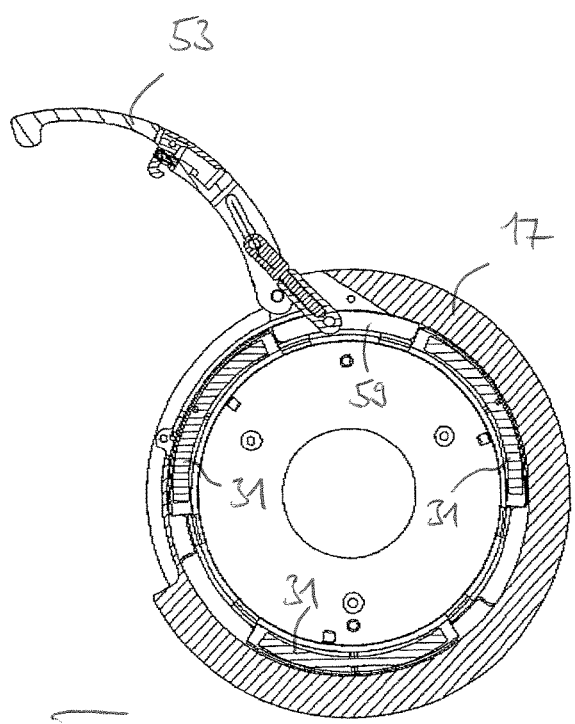
Figure 6:
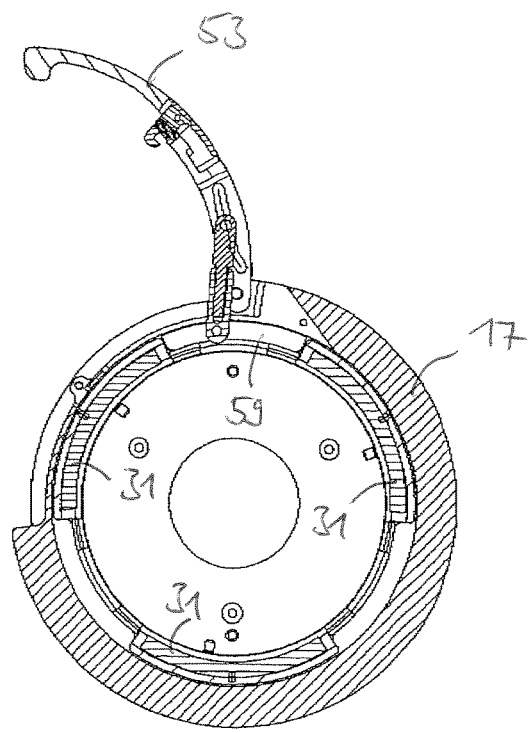
Figure 7:
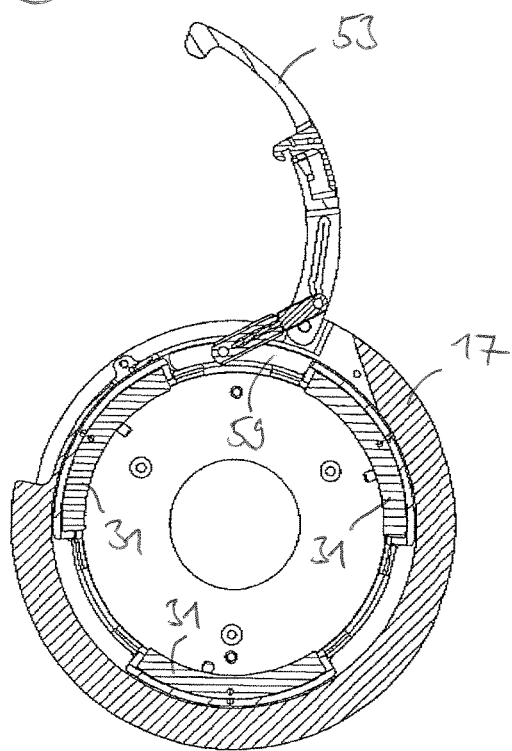
Figure 8:
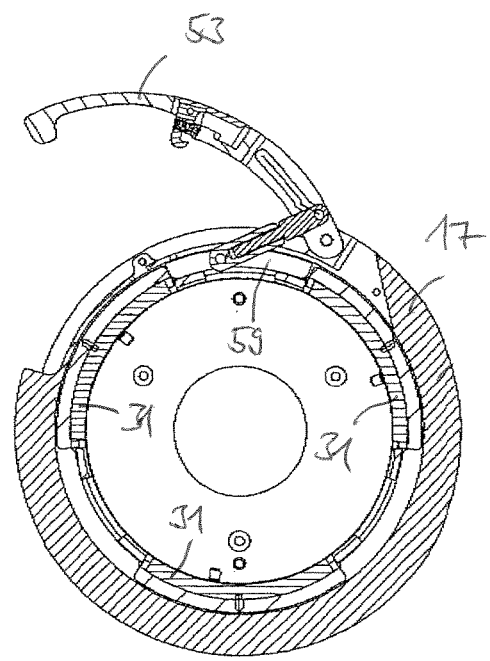

Non-restricting embodiments of the invention are shown in the drawing and will be described in the following. There are shown, FIG. 1 a perspective view of a fastening device in accordance with the invention for a rotary evaporator;

FIG. 2 the fastening device of FIG. 1 in a frontal view;

FIG. 3 a longitudinal section through the fastening device of FIG. 1 along the line A-a in FIG. 2 with an inserted evaporator flask;

FIG. 4 an exploded representation of the fastening device of FIG. 1;

FIG. 5 a cross-section through the fastening device of FIG. 1 along the line B-B in FIG. 3, with a retainer element being shown in a first rotational position and a tensioning lever in an open position;

FIG. 6 the view of FIG. 5, with the retainer element being rotated clockwise by a part of a first part distance;

FIG. 7 the view of FIG. 5, with the retainer element being rotated clockwise by a first part distance;

FIG. 8 the view of FIG. 7, with the tensioning lever being partly closed; and

Figure 9:
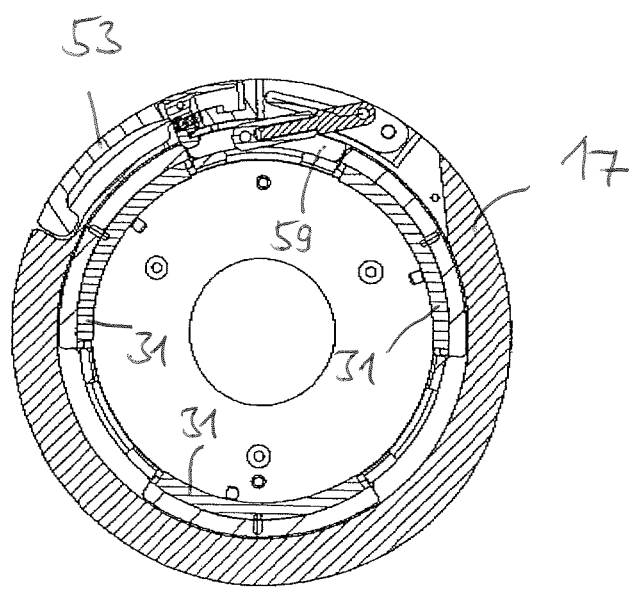

FIG. 9 the view of FIG. 7, with the tensioning lever being completely closed.

The fastening device in accordance with the invention for an evaporator flask 77 of a rotary evaporator shown in FIGS. 1 to 4 first comprises a ring-shaped connector section 11 that can be screwed to a hub, not shown, of a rotary drive of a rotary evaporator located at the left of the connector section 11 in FIG. 3. The connector section 11 has a connector stub 13 at which three radially outwardly projecting first engagement elements 15 are provided that are arranged distributed evenly in the peripheral direction. The fastening device furthermore comprises a ring-shaped two-part retainer element 17 that comprises a bayonet ring 19 and a carrier ring 21. The two rings 19, 21 are screwed to one another, i.e. are fixedly connected to one another. The bayonet ring 19 has a number of radially inwardly projecting second engagement elements 23 corresponding to the number of first engagement elements 15, i.e. three second engagement elements 23 that are provided equally distributed at the bayonet ring 19 in the peripheral direction.

To install the fastening device, the retainer element 17 is placed axially onto the connector section 11 in one of three possible rotational positions such that the first engagement elements 15 and the second engagement elements 23 engage meshingly with one another or slide past one another. The retainer element 17 is subsequently releasably removably held at the connector section 11 by an installation screw 25 that extends through a bore in the carrier ring 21 behind one of the first engagement elements 15. The retainer element 17 is then located in a starting position relative to the connector section 11. The inner space surrounded by the connector section 11 and by the two rings 19, 21 provides a receiving space 73 in which a flange-shaped connection region 75 of an evaporator flask 77 can be received.

The retainer element 17 can be rotated from this starting position relative to the connector section 11 into an end position in which the aforesaid flange-shaped connection region 75 of an evaporator flask 77 received in the receiving space 73 of the fastening device is held in a form-fitting and/or force-fitting manner. In this respect, the first and second engagement elements 15, 23 engage behind one another. Since the axial side surfaces of the first engagement elements 15 directed to the left in FIG. 4 are each provided with a first sloping surface 27 and since the axial side surfaces of the second engagement elements 23 directed to the right are each provided with a second sloping surface 29 corresponding thereto, the rotational movement 47 of the retainer element 17 from the starting position into the end position is converted into an axial movement 49 of the retainer element 17 to the connector section 11 (cf. FIG. 3). On a rotation of the retainer element 17 relative to the connector section 11, the connector section 11 is advantageously rotationally fixedly held.

Three clamping elements 31 arranged evenly distributed in the peripheral direction are provided between the connector section 11 and the retainer element 17. In this respect, the clamping elements 31 are each supported at one of the first engagement elements 15. The clamping elements 31 are each elongated in the peripheral direction and are of part-circular shape. On a rotation of the retainer element 17 from the starting position into the end position, a radially inwardly projecting ring web 33 formed at the retainer element 17 presses the clamping elements 31 axially toward the first engagement elements 15. Since the clamping elements 31 each have a chamfer 35 at their radially outer edges facing the connector section 11 and since the first engagement elements 15 have a chamfer 37 respectively corresponding therewith, the clamping elements 31 travel radially inwardly and axially toward the connector element 11 on a rotation of the retainer element 17, i.e. the axial movement 49 of the retainer element 17 is converted into a combined radial and axial movement 51 of the clamping elements 31 (cf. FIG. 3).

The clamping elements 31 are traveled, on a rotation of the retainer element 17 from the starting position into the end position, from a release position in which the clamping elements 31 are retracted from the receiving space 73 of the fastening device into a holding position in which the clamping elements 31 project into the receiving space 73 such that a flange-shaped connection region 75 of an evaporator flask 77 received in the receiving space 73 can be clampingly held in a form-fitting and force-fitting manner. The clamping holding is in particular achieved in that the clamping elements 31 have a further chamfer 39 at their radially inner edges facing the connector section 11, said chamfer clampingly pressing onto a chamfer 41 corresponding thereto at the aforesaid flange-shaped connection region 75 of the evaporator flask 77 (FIG. 3). To release the evaporator flask 77 again for a removal from the receiving space 73 on the rotating back of the retainer element 17, a circlip 43 is provided that engages at a radial inner surface of the clamping elements 31 and presses it radially outwardly under a preload.

The retainer element 17 is provided with a tensioning lever 53 for rotation. An end of the tensioning lever 53 is pivotably supported at an articulated point at the retainer element 17 and is adjustable between the open position shown in FIGS. 5 to 7 and the closed position shown in FIG. 9 in which the clamping elements 31 adopt their holding position, with the two positions bounding a pivot region of at least substantially 90°. The tensioning lever 53 is of part-circular shape and its longitudinal extent runs in the peripheral direction of the retainer element 17. To integrate the tensioning lever 53 in the retainer element 17, a recess 55 is formed at a radial outer side of the retainer element 17 and the tensioning lever 53 is received therein in the closed position.

A control arm 57 is furthermore provided whose first end is pivotably supported at a tensioning element 59. The tensioning element 59 is inserted into the space between two first engagement elements 15 of the connector section 11 such that a rotation of the tensioning element 59 relative to the connector section 11 is not possible. The second end of the control arm 57 engages via a cylinder pin 61 into a control cam 63 formed as a guide slot in the tensioning lever 53. The control cam 63 has a first straight section 65 and a second straight section 67 having an end point 69, wherein the second section 67 adjoins a kink point at the first section 65 in an angled manner. The first section 65 extends tangentially in the closed position of the tensioning lever 53 and radially to the retainer element 17 in the open position of the tensioning lever 53. The second section 67 is inclined away from the retainer element 17 with respect to the first section 65 in the closed position of the tensioning lever 53.

The fastening or releasing of a flange-shaped connection region 75 of an evaporator flask 77 received in the receiving space 73 of the fastening device takes place as follows:

In FIG. 5, the retainer element 17 is in its starting position, the clamping elements 31 are in their release position and the tensioning lever 53 is open. In this state of the fastening device, a flange-shaped connection region 75 of an evaporator flask 77 is introduced into the receiving space 73 of the fastening device.

Subsequently in a first step, the retainer elements 17 is rotated by a first part distance with an open tensioning lever 53 from the starting position clockwise with respect to the connector element 11 until the cylinder pin 61 that is still at its starting point in FIG. 5 abuts the end point 69 of the control cam 63. This corresponds to an abutment position for the tensioning lever 53. A further rotation of the retainer element 17 with an open tensioning lever 53 is then no longer possible. Due to the sloping surfaces 27, 29 formed at the first and second engagement elements 15, 23 and the chamfers 35, 37 formed at the clamping elements 31 and at the first engagement elements, the rotational movement of the retainer element 17 is ultimately converted into a movement of the clamping elements 31 with a radially inwardly directed component from their release position, i.e. the clamping elements 31 approach their holding position in which they clampingly embrace the flange-shaped connection region 75 of the evaporator flask 77 inserted into the receiving space 73 of the fastening device. This is shown in FIGS. 6 and 7.

The tensioning lever 53 is then closed in a second step. In this respect, the retainer element 17 is further rotated by a second part distance that is substantially shorter in comparison with the first part distance into its end position. The further rotation of the retainer element 17 by the second part distance is ultimately due to the fact that the articulation point 71 of the tensioning lever 53 is moved clockwise in the manner of a toggle lever on the closing of the tensioning lever 53. The cylinder pin 61 in this respect does not move out of the end point 69, i.e. the closing of the tensioning lever 53 takes place about an axis of rotation stationary with respect to the tensioning lever 53. The clamping elements 31 are traveled onward with a radially inwardly directed component to reach their holding position in the closed position of the tensioning lever 53, in which holding position they clampingly hold the flange-shaped connection region 75 of the inserted evaporator flask 77. This is shown in FIGS. 8 and 9.

To be able to remove the evaporator flask 77 from the fastening device again, the tensioning lever 53 is opened again in a first step, whereby the retainer element 17 is rotated back by the second part distance. In the first stage, the cylinder pin 61 runs back up to the kink point between the two sections 65, 67 of the control cam 63, with substantially no force having to be applied by an operator in this respect. In a second stage, the retainer element is then rotated back by the first part distance into the starting position with an open tensioning lever 53 by tightening at the tensioning lever 53 and the cylinder pin 61 runs back to its starting point. Due to its preload, the circlip 43 provides that the clamping elements 31 are also again pressed radially outwardly from the receiving space 73 back in the direction of their release position in both stages.

The control arm 57 is adjustable in its length. For this purpose, the control arm 57 comprises a tensioning screw 79 and a clamping nut 81. The starting point of the cylinder pin 61 in the control cam 63 and the tightening torque exerted by the tensioning lever 53 in the closed position can be set via the length of the control arm 57. A catch 83 with whose aid the tensioning lever 53 can be latched to the retainer element 17 and that is pivotably supported in the tensioning lever 53 and is preloaded into a latching position, for example by means of a yoke spring, is furthermore provided. For this purpose, the catch 83 engages into a latching mount formed in the retainer element 17 and in so doing engages behind a latching edge of the latching mount.

The fastening device furthermore comprises an outer edge protective ring 85 and an inner edge protective ring 87. The outer edge protective ring 85 is provided, in particular clipped, at the radially inner edge of the retainer element 17 remote from the connector section 11 and is chamfered at its radially inner edge remote from the connector section 11. The inner edge protective ring 87 is provided, in particular pressed, at the radially inner edge of the connector section 11 facing the retainer element 17 and is chamfered at its radially inner edge facing the retainer element 17. A centering function can additionally be ensured by the two edge protective rings 85, 87 on the insertion of a flange-shaped connection region of an evaporator flask. In this respect, the largest inner diameter of the chamfer of the inner edge protective ring 87 is in particular not smaller than the smallest inner diameter of the chamfer of the outer edge protective ring 85. A sealing device 89 is furthermore provided that is clamped between the flange-shaped connection region 75 of the evaporator flask 77 and the connector section 11 on the coupling of the retainer element 17 to the connector section 11.

REFERENCE NUMERAL LIST 11 connector section
13 connector stub
15 first engagement element
17 retainer element
19 bayonet ring
21 carrier ring
23 second engagement element
25 installation screw
27 first sloping surface
29 second sloping surface
31 clamping element
33 ring web
35 chamfer
37 chamfer
39 chamfer 41 chamfer
43 circlip
47 rotational movement
49 axial movement
51 combined radial and axial movement
53 tensioning lever
55 recess
57 control arm
59 tensioning element
61 cylinder pin
63 control cam
65 first section
67 second section
69 end point
71 articulation point
73 receiving space
75 flanged-shaped connection region
77 evaporator flask
79 tensioning screw
81 clamping nut
83 catch
85 outer edge protective ring
87 inner edge protective ring
89 sealing device

The invention claimed is:

1. A rotary evaporator comprising a rotary drive and a fastening device attached to the rotary drive and having a receiving space for receiving an evaporator flask rotatable by the rotary drive, wherein the fastening device comprises a connector section at the rotary drive side and a retainer element at the evaporator flask side that is coupled to the connector section and that is rotatable relative to the connector section between a starting position and an end position,
    wherein the fastening device comprises at least one clamping element that is moved, on the rotation of the retainer element relative to the connector section from the starting position into the end position, from a release position radially inwardly into a holding position in which the respective clamping element projects into the receiving space to hold a flange-shaped connection region of an evaporator flask received in the receiving space of the fastening device in a form-fitting and/or force-fitting manner and to secure it against a removal from the receiving space,
    the rotary evaporator further comprising means that convert a rotation of the retainer element relative to the connector section from the starting position into the end position into an axial movement of the retainer element relative to the connector section, with further means being provided that convert the axial movement of the retainer element into the radial movement and simultaneously the axial movement of the respective clamping element,
    wherein the further means comprise the respective clamping element being chamfered at its radially outer edge facing the connector section and the connector section having a chamfer corresponding hereto, and
    wherein the respective clamping element is moved, on a rotation of the retainer element relative to the connector section from the starting position into the end position, radially inwardly and simultaneously axially toward the connector section.

2. The rotary evaporator in accordance with claim 1, wherein the connector section is fastened to the rotary drive.

3. The rotary evaporator in accordance with claim 1, wherein the retainer element is releasably couplable to the connector section.

4. The rotary evaporator in accordance with claim 1, wherein the coupling of the retainer element to the connector section takes place free of a screw connection.

5. The rotary evaporator in accordance with claim 1, wherein the retainer element can be placed onto the connector section into the starting position in one or more discrete rotational positions.

6. The rotary evaporator in accordance with claim 1, wherein the connector section comprises a plurality of radially outwardly projecting first engagement elements and the retainer element comprises a plurality of radially inwardly projecting second engagement elements, with the first engagement elements and the second engagement elements meshingly engaging into one another in the starting position and engaging behind one another in a rotated position.

7. The rotary evaporator in accordance with claim 6, wherein the first engagement elements and the second engagement elements are each arranged evenly distributed in the peripheral direction at the connector section and at the retainer element, respectively.

8. The rotary evaporator in accordance with claim 1, wherein the respective clamping element is arranged between the connector section and the retainer element.

9. The rotary evaporator in accordance with claim 1, wherein, on the rotation of the retainer element relative to the connector section from the starting position into the end position, the respective clamping element is pressed by the retainer element axially toward the connector section.

10. The rotary evaporator in accordance with claim 1, wherein the means comprise mutually corresponding sloping surfaces that are formed at the connector section, on the one hand, and at the retainer element, on the other hand.

11. The rotary evaporator in accordance with claim 1, wherein the respective clamping element is chamfered at its radially inner edge facing the connector section to cooperate with a chamfer corresponding hereto at the flange-shaped connection region of an evaporator flask received in the fastening device.

12. The rotary evaporator in accordance with claim 1, wherein the respective clamping element is preloaded from its holding position into the release position.

13. The rotary evaporator in accordance with claim 12, wherein a circlip is provided to preload the respective clamping element.

14. The rotary evaporator in accordance with claim 1, wherein the respective clamping element is elongated and/or is of part-circle shape.

15. The rotary evaporator in accordance with claim 1, wherein a plurality of clamping elements are arranged evenly distributed in the peripheral direction.

16. The rotary evaporator in accordance with claim 1, wherein the respective clamping element cooperates with a respective first engagement element of the connector section.

17. The rotary evaporator in accordance with claim 1, wherein the retainer element is provided with a tensioning lever for rotation, with an end of said tensioning lever being pivotably supported at an articulation point at the retainer element and being adjustable between an open position and a closed position in which the respective clamping element adopts the holding position.

18. The rotary evaporator in accordance with claim 17, wherein the tensioning lever is coupled to the retainer element and to the connector section such that the rotation of the retainer element relative to the connector section from the starting position into the end position takes place in two stages, with in a first stage the retainer element being rotated with an open tensioning lever from the starting position by a first part distance into an abutment position for the tensioning lever, and with in a second stage the tensioning lever being closed in a second stage to rotate the retainer element from the abutment position by a second part distance into the end position.

19. The rotary evaporator in accordance with claim 18, wherein the first part distance is longer than the second part distance.

20. The rotary evaporator in accordance with claim 18, wherein the rotating back of the retainer element relative to the connector section from the end position into the starting position takes place in two stages, with the tensioning lever being opened to rotate the retainer element by the second part distance from the end position in a first stage and with the retainer element being rotated back into the starting position with an open tensioning lever in a second stage.

21. The rotary evaporator in accordance with claim 17, wherein the longitudinal extent of the tensioning lever extends in the peripheral direction of the retainer element;
wherein the tensioning lever is of part-circle shape and/or is received in a radially outer recess of the retainer element in the closed position.

22. The rotary evaporator in accordance with claim 17, wherein pivot range of the tensioning lever between the open position and the closed position amounts to no more than 120°.

23. The rotary evaporator in accordance with claim 17, wherein the tensioning lever acts as a toggle lever on closing to rotate the retainer element from the abutment position by a second part distance into the end position.

24. The rotary evaporator in accordance with claim 17, further comprising a control arm having a first end and a second end, with the first end being pivotably supported at the connector section and with the second end being in engagement via a guide element with a control cam, with the control cam being formed at the tensioning lever.

25. The rotary evaporator in accordance with claim 24, wherein the first end of the control arm is pivotably supported at a tensioning element that is inserted into a correspondingly configured mount of the connector section that prevents a rotation of the tensioning element relative to the connector section.

26. The rotary evaporator in accordance with claim 25, wherein the tensioning element is inserted between two radially outwardly projecting engagement elements of the connector section.

27. The rotary evaporator in accordance with claim 24, wherein the control cam has a first section and a second section adjoining it at an angle at a kink point, with the second section having an end point.

28. The rotary evaporator in accordance with claim 27, wherein, in the closed position of the tensioning lever, the first section extends tangentially and/or, in the open position, extends radially to the retainer element; and/or wherein the second section is angled away from the retainer element with respect to the first section in the closed position of the tensioning lever.

29. The rotary evaporator in accordance with claim 27, wherein the guide element is at a starting point in the first section in the starting position of the retainer element and is traveled by a first part distance toward the end point on the rotation of the retainer element relative to the connector section; and/or wherein the guide element remains at the end point on a rotation of the retainer element by a second part distance relative to the connector section.

30. The rotary evaporator in accordance with claim 27, wherein the guide element is traveled by the second part distance to the kink point on a rotating back of the retainer element relative to the connector section; and/or wherein the guide element is traveled by the first part distance to the starting point on a rotating back of the retainer element relative to the connector section.

31. The rotary evaporator in accordance with claim 24, wherein the control arm is longitudinally adjustable.

32. The rotary evaporator in accordance with claim 31, wherein a starting point of the guide element in the first section of the control cam is adjustable via the length of the control arm.

33. The rotary evaporator in accordance with claim 17, wherein a latching device is provided to latch the tensioning lever to the retainer element in the closed position.

34. The rotary evaporator in accordance with claim 1, wherein the radially inner edge of the retainer element remote from the connector section is provided with an outer edge protective ring and/or the radial inner edge of the connector section facing the retainer element is provided with an inner edge protective ring.

35. The rotary evaporator in accordance with claim 34, wherein the radially inner edge of the outer edge protective ring remote from the connector section is chamfered; and/or the radially inner edge of the inner edge protective ring facing the retainer element is chamfered.

36. The rotary evaporator in accordance with claim 34, wherein the largest inner diameter of a chamfer of the inner edge protective ring is not smaller than the smallest inner diameter of a chamfer of the outer edge protective ring.

* * * * *